US011099865B2

(12) United States Patent
Ma et al.

(10) Patent No.: US 11,099,865 B2
(45) Date of Patent: Aug. 24, 2021

(54) AUDITING CLIPBOARD OPERATIONS IN VIRTUAL DESKTOP ENVIRONMENTS

(71) Applicant: VMware, Inc., Palo Alto, CA (US)

(72) Inventors: Yuan Ma, Beijing (CN); Zhi Lin, Beijing (CN); Jinxing Hu, Beijing (CN); Baochen Wang, Beijing (CN); Yang Yu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 46 days.

(21) Appl. No.: 16/271,587

(22) Filed: Feb. 8, 2019

(65) Prior Publication Data

US 2020/0210214 A1      Jul. 2, 2020

Related U.S. Application Data

(63) Continuation of application No. PCT/CN2019/070124, filed on Jan. 2, 2019.

(51) Int. Cl.
*G06F 9/54* (2006.01)
*G06F 9/451* (2018.01)

(52) U.S. Cl.
CPC .............. *G06F 9/452* (2018.02); *G06F 9/543* (2013.01)

(58) Field of Classification Search
CPC .................................. G06F 9/543; G06F 9/452
See application file for complete search history.

(56) References Cited

U.S. PATENT DOCUMENTS

| 6,202,100 | B1 * | 3/2001 | Maltby | ................... | G06F 9/543 |
| | | | | | 719/329 |
| 9,672,366 | B1 * | 6/2017 | Khetawat | ................ | G06F 9/543 |
| 2004/0210846 | A1 * | 10/2004 | Olsen | ...................... | H04L 29/06 |
| | | | | | 715/761 |
| 2009/0007111 | A1 * | 1/2009 | Nelson | ................ | G06F 9/45558 |
| | | | | | 718/1 |
| 2012/0192176 | A1 * | 7/2012 | Shah | ................... | G06F 9/45558 |
| | | | | | 718/1 |
| 2016/0342449 | A1 * | 11/2016 | Wong | ........................ | G06F 7/08 |
| 2017/0154188 | A1 * | 6/2017 | Meier | ................. | G06F 21/6209 |
| 2017/0346894 | A1 * | 11/2017 | Zhang | ................. | H04L 67/1095 |

* cited by examiner

*Primary Examiner* — Beau D Spratt (57) ABSTRACT

Techniques are described for auditing clipboard operations in virtual desktop environments. The auditing takes place by detecting clipboard operations that are being redirected between the virtual desktop and the client device and recording log entries containing information about each clipboard operation that was redirected. In order to reduce auditing potential noise information, the redirection process is modified to delay populating the clipboard and recording log entries until a paste operation or other request for the clipboard is detected. In some situations, the clipboard redirection may be blocked based on the auditing capability, such as in cases where the auditing cannot take place due to the client computing device lacking support for auditing the clipboard operation and recording the necessary log entry.

17 Claims, 6 Drawing Sheets

AUDITING CLIPBOARD OPERATIONS IN VIRTUAL DESKTOP ENVIRONMENTS

CLAIM OF PRIORITY

This application is a continuation of International Application PCT/CN2019/070124, entitled "AUDITING CLIPBOARD OPERATIONS IN VIRTUAL DESKTOP ENVIRONMENTS", by Yuan Ma et al., with an international filing date of Jan. 2, 2019, which is incorporated by reference herein in its entirety.

TECHNICAL FIELD

The present disclosure generally relates to virtual desktop environments and more specifically to techniques for auditing and logging clipboard events, such as redirected copy and paste operations, in a virtual desktop environment.

BACKGROUND

Desktop virtualization technologies, such as those provided as part of a virtual desktop infrastructure (VDI) or desktop-as-a-service (DAAS) offerings, are becoming more commonplace in today's enterprise work environments. The security of having a remotely stored desktop, ability to access the desktop and applications from any location and on any device, centralized desktop management, efficient use of hardware resources, as well as numerous other benefits made possible by VDI/DAAS are a large benefit for many organizations.

There are many implementations of desktop virtualization, some of which offer a full desktop while others provide individual remotely accessible applications. Regardless of the implementation, a common characteristic of these technologies is that the application execution takes place on remote host server usually located in a data center, while the user uses a local client device to access the application over a network connection. For example, in a conventional VDI deployment, each user in an enterprise is provisioned a virtual desktop and is allowed to access his or her virtual desktop over a remote network connection, such as a WAN connection. The virtual desktops are typically hosted on servers that physically reside in a data center of the enterprise or a third-party service provider and each host server may execute multiple virtual desktops. Users can utilize a client device to remotely log into their individual virtual desktop and the client device communicates with the desktop over the network using a remote display protocol, such as remote desktop protocol (RDP), PC-over-IP protocol (PCoIP), VMware Blast, virtual network computing (VNC) protocol, or the like. Using the remote desktop protocol, the user can interact with applications of the virtual desktop which are running on the remote host server in such a way that only the display, keyboard, and mouse information is communicated with the local client device. A common implementation of this approach is to host multiple desktop operating system instances on separate virtual machines deployed on a server hardware platform running a hypervisor.

When desktop virtualization first became available, due to the nature of remote interaction with the desktop or application, certain conventional application features and functionality did not operate as users expected. An example of this is common clipboard operations, such as cut/copy and paste. In the past, when the user clicked on the "Copy" or "Cut" function in their virtual desktop window, the data was copied to the clipboard on the remote desktop operating system, however this data was not automatically synchronized with the clipboard on the user's local client device. This led to unexpected behavior when the user tried to subsequently "Paste" the data in a local application running on their client device only to find out that the data was not available. To solve this problem, some companies have developed a feature for synchronizing the clipboard on the local client device with the clipboard of the remote desktop. This feature is sometimes referred to as "clipboard redirection" and usually involves a process for sending the clipboard data over the network between the virtual desktop and the client device. This functionality resolves some of the unexpected behavior mentioned above, however it introduces other considerations and concerns.

From an enterprise perspective, one important advantage of deploying virtual desktop infrastructure (VDI) or other desktop virtualization solution is the ability to have centralized management and control over the software and data. In general, security is substantially improved with virtualized desktop deployments because sensitive corporate data remains on the premises of the enterprise (e.g. in a data center) and employees and other individuals mostly view the data over the remote connection, meaning that only display information is communicated outside the premises unless permitted otherwise. While this does not fully preclude malicious users from gaining access to the corporate data (for example by way of screen capture methods), it does place a significant limitation on easily transferring large amounts of corporate data outside of the enterprise, which is desirable for many organizations that manage sensitive information, such as banks and financial institutions.

There is a natural tension between features such as clipboard redirection discussed above and the security advantages of desktop virtualization because clipboard redirection provides the ability to transfer relatively large amounts of data into and out of the virtual desktop by copying and pasting the data between the desktop and the client device. In light of these potential vulnerabilities, improved techniques for remotely accessing desktops and applications is desirable.

DETAILED DESCRIPTION

Systems and methods in accordance with various embodiments described herein overcome at least some of the deficiencies described above by providing ways to audit clipboard operations in virtual desktop environments. The auditing takes place by detecting clipboard operations that are being redirected between the virtual desktop and the client device and recording log entries containing information about each clipboard operation that was redirected. In order to reduce auditing potential noise information, the redirection process is modified to delay populating the clipboard and recording log entries until a paste operation or other request for the clipboard data is detected. In some embodiments, the clipboard redirection may be blocked based on the auditing capability, such as in situations where the auditing cannot take place due to the client computing device lacking support for auditing the clipboard operation and recording the necessary log entry. In these embodiments, clipboard redirection is only allowed to proceed when the clipboard audit is supported by both the virtual desktop agent and the virtual desktop client.

In various embodiments, a virtual desktop session is first established between a virtual desktop client operating on a client computing device and a virtual desktop agent operating on a host server. The virtual desktop client is responsible for displaying the desktop user interface (UI) information (i.e. framebuffer pixel data) received from the virtual desktop agent, as well as for capturing local user inputs such as keyboard and mouse events and transmitting them to the virtual desktop agent. Conversely, the virtual desktop agent is responsible for providing the user input to the guest operating system of the virtual desktop on the host server and is also responsible transmitting the UI information stored in the framebuffer of the host server over the network to the virtual desktop client.

During the virtual desktop session, clipboard operations may be redirected between the virtual desktop client and the virtual desktop agent. The clipboard redirection may be performed in either of two different directions: (1) from the virtual desktop to the client device or (2) from the client device to the virtual desktop. In the first scenario, when a user selects an item inside the UI of the virtual desktop and clicks the control-C (or control-X) key on their client device, that input event is transmitted from the client device to the virtual desktop and a corresponding "Copy" or "Cut" operation is triggered on the virtual desktop which places data into the clipboard of the guest operating system (OS) on the host server. In response to detecting the cut/copy operation, the virtual desktop agent transmits the clipboard data to the virtual desktop client over the network connection in order to synchronize the clipboard of the client device with the clipboard on the virtual desktop. In one embodiment, the data is transmitted over a separate virtual channel of the desktop remoting protocol established between the virtual desktop agent and the virtual desktop client specifically for the purpose of synchronizing clipboard data. The virtual desktop client receives the data and uses the clipboard delay rendering feature of the OS to delay populating the clipboard of the local client device until a paste operation is detected. Clipboard delay rendering is a feature of the operating system that allows an application requesting to place data into the clipboard of the OS to delay rendering that data in a particular format until the data is requested from the OS. In various embodiments described herein, the virtual desktop client invokes the clipboard delay rendering feature in order to delay placing the data into the clipboard of the client device until that data is actually requested.

Subsequently, when a paste operation is detected that requests data from the clipboard on the client computing device (e.g. when a user clicks control-V on the client device in an application outside of their virtual desktop interface), the virtual desktop client populates the data received from the virtual desktop agent into the clipboard of the OS of the client computing device so that the clipboard data can be provided to the requesting application on the client device. At the time of the paste operation, a log entry is recorded into an event log, describing the details of the cut/copy and paste operation, such as information about the user that performed the clipboard operation, the total amount and format of data copied and pasted, the IP address of the client device, and the like. Notably, in the embodiments utilizing the clipboard delay rendering option, the log entry is only recorded when the data is actually pasted rather than continuing to log all cut/copy operations which may or may not be pasted outside of the virtual desktop.

The first scenario described above is referred to as desktop-to-client redirection because the clipboard data is transmitted from the virtual desktop agent to the virtual desktop client. Frequently, this is the more important scenario to audit because it provides an avenue for potentially sensitive corporate data to leave the premises of the organization and it is desirable for many organizations to be able to track this type of activity.

The second scenario is referred to herein as client-to-desktop redirection. In this scenario, a user may select an item or data inside the UI of an application running locally on the client computing device and click the control-C/control-X key (or otherwise invoke a clipboard cut/copy operation). As a result of the user input, the selected data is copied to the local clipboard of the OS of the client computing device. The virtual desktop client detects the local cut/copy operation occurring on the client device and transmits the data copied to the clipboard of the client device to the virtual desktop agent over the network connection. This can be performed over the virtual channel established between the virtual desktop client and the virtual desktop agent for clipboard data synchronization. The virtual desktop agent receives the clipboard data and uses the clipboard delay rendering feature to delay populating the clipboard of the guest OS of the virtual desktop until a paste operation is detected. Subsequently, when an application running inside the virtual desktop issues a paste operation to the guest OS of the virtual desktop, the virtual desktop agent detects the paste operation and populates the clipboard of the guest OS to make the clipboard data received from the virtual desktop client available to the requesting application.

In some embodiments, prior to redirecting the clipboard operation, a determination can be made whether clipboard operation auditing is configured or supported by both the virtual desktop client and the virtual desktop agent. For example, there may be situations where the user is using a version of the virtual desktop client (e.g. older version) that does not support the auditing of clipboard operations, while the virtual desktop does support clipboard auditing. This means that the version of the virtual desktop client is not configured to record the log entry describing the redirected clipboard operation in an event log even if it is capable of performing the clipboard redirection functionality. If this is the case, the virtual desktop agent may block the transmission of the clipboard data to the virtual desktop client and the redirection is prevented. Similarly, the virtual desktop client may be configured to block clipboard redirection if the virtual desktop does not support auditing clipboard operations or is not properly configured to record log entries describing the operation. In some embodiments, the blocking of clipboard redirection is a configuration option that can be selected by the administrator.

In deployments where individual applications are separately remoted to the client device (as opposed to remoting the entire desktop), clipboard auditing may distinguish between clipboard operations originating in applications from the same server farm. This may be useful when the clipboard redirection occurs between two remotely accessible applications which both reside on the premises (e.g. data center) of the same organization. For example, if the application that issued the redirected copy operation and the application that requested the paste operation reside in the same server farm, it may be desirable not to log this event, or at least not log it as a clipboard operation that transmitted any data outside of the premises of the organization. In these cases, the audit message is not generated and consequently the log entry is not recorded for these clipboard redirection events. Alternatively, the log entry may be recorded along with information identifying that the clipboard operation was redirected between applications residing in the same server farm. In these embodiments, the clipboard data sequence number of the OS clipboard can be queried via an API and if this sequence number matches between the copy and paste operations, it can be used to identify the situation where the applications reside in the same server farm.

It should be noted that throughout this disclosure the cut/copy operation may in some cases be referred to simply as a copy operation for readability purposes, however it will be understood by a person of ordinary skill in the art that copy operations and cut operations are both covered by the various embodiments described in this disclosure.

Figure 1:
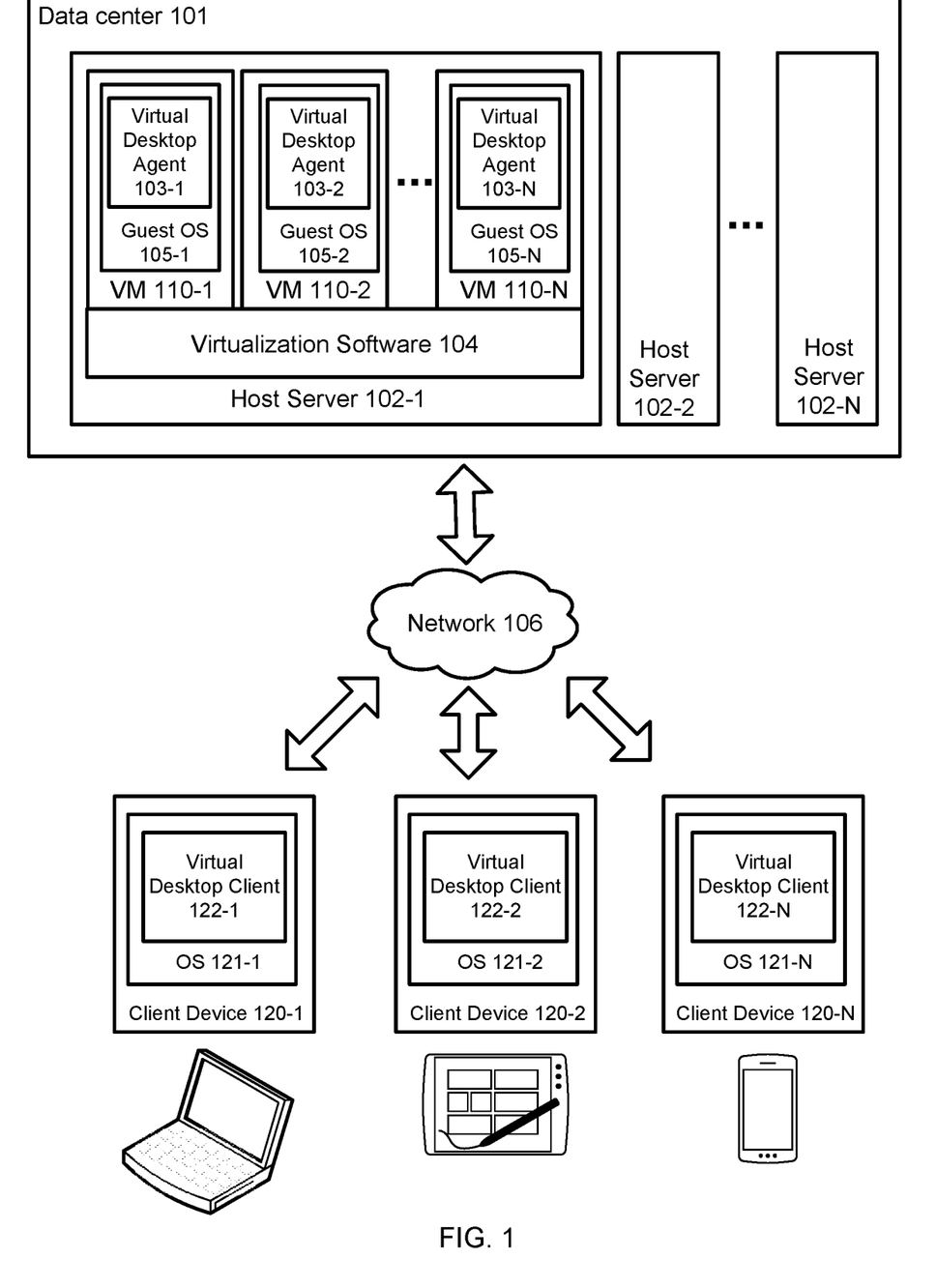
FIG. 1 illustrates an example of a virtual desktop environment, in accordance with various embodiments.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the virtual desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local client device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each VM hosting a desktop for each individual user. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In one embodiment, the interaction is performed by the virtual desktop agent transmitting encoded visual display information (e.g., framebuffer pixel data) over the network to the virtual desktop client and the virtual desktop client in turn transmitting user input events (e.g. keyboard, mouse, touch input events) to the remote desktop agent. Interactions between the virtual desktop client (e.g., 122-1, 122-2, 122-N) and the virtual desktop agent (e.g. 103-1, 103-2, 103-N), including transmission of encoded visual display information from the agent to the client and user input events from the client to the agent can be performed using a remote desktop protocol, such as Remote Desktop Protocol (RDP), PC-over-IP protocol (PCoIP), VMware Blast protocol, virtual network computing (VNC) protocol, or the like.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment might include many more host servers, which may be distributed over multiple data centers, which can include many other types of devices, such as switches, power supplies, cooling systems, environmental controls, and the like, which are not illustrated herein. Similarly, a single host server would typically host many more virtual machines than the number shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

Figure 2:
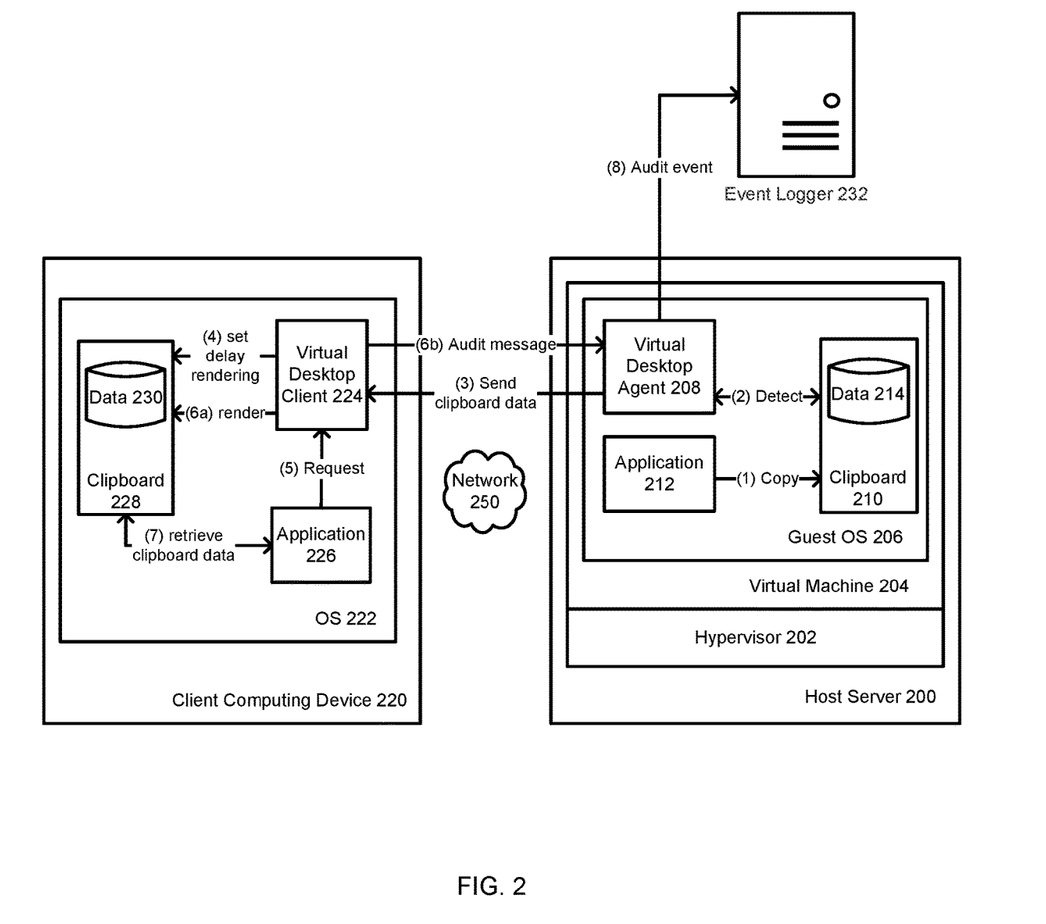
FIG. 2 is an illustration of auditing desktop-to-client redirected clipboard operations, in accordance with various embodiments.

FIG. 2 is an illustration of auditing desktop-to-client redirected clipboard operations, in accordance with various embodiments. As previously mentioned, the virtual desktop is provided using a guest operating system (OS) 206 running on a virtual machine 204 hosted on a host server 200 using a hypervisor 202. The guest OS 206 can be any operating system capable of executing a desktop, including Microsoft Windows, Linux, macOS, or the like. Similarly, the hypervisor 202 can be any commercially available virtualization software capable of hosting virtual machines, such as VMware ESX or ESXi, Citrix XenDesktop, Linux KVM, Microsoft Hyper-V, or the like.

As previously described, before auditing clipboard redirection may begin, a virtual desktop session is established between the virtual desktop agent 208 operating on the host server 200 and the virtual desktop client 224 operating on the client computing device 220. During this initial session setup phase, the virtual desktop client 224 and the virtual desktop agent 208 negotiate the various parameters related to the session, including exchanging version information, maximum clipboard size, supported capability information, such as whether clipboard auditing is supported, and the like. For example, the maximum clipboard size for the virtual desktop session may be set to the lesser of the maximum clipboard sizes supported by the guest OS 206 on the host server 200 and the OS 222 of the client computing device 220. A group policy object (GPO) may also be associated with the virtual desktop session, which specifies whether clipboard auditing is configured for the virtual desktop session. In one embodiment, the GPO may specify one of 4 options for clipboard auditing: (1) clipboard auditing is disabled in both directions; (2) clipboard auditing is enabled from desktop-to-client only; (3) clipboard auditing enabled from client-to-desktop only; or (4) clipboard auditing enabled in both directions. The GPO may be configured by an administrator and specified in a configuration file. As previously mentioned, desktop-to-client redirection frequently presents a higher security risk than client-to-desktop redirection and as such, the default option in the GPO may be set to clipboard auditing being enabled from desktop-to-client only so that these redirected clipboard operations ensured to be audited.

In the illustrated embodiment, clipboard redirection may be initiated when a user selects an object or text inside of an application 212 executing on their virtual desktop and issues a clipboard operation that places data into the clipboard 210 of the guest OS 206, such as by clicking on the control-C key, control-X key or right clicking and selecting the "Copy" or "Cut" menu options from a dropdown menu. It should be noted that although the user's input device (mouse/keyboard) is actually physically located on the client computing device, the input information (mouse and keyboard events) is transmitted over the network 250 to the host server 200 and conveyed to the guest OS 206 as part of the desktop remoting protocol. As a result of this input, the data 214 is placed into the clipboard 210 of the guest OS 206.

The virtual desktop agent 208 detects that data 214 has been placed into the clipboard 210 and transmits the clipboard data 214 to the virtual desktop client 224 over the network 250. In one embodiment, the clipboard data 214 is transmitted over a separate virtual channel of the desktop remoting protocol, established between the virtual desktop client 224 and the virtual desktop agent 208 for the purpose of synchronizing clipboard information. The desktop remoting protocol may utilize a plurality of separate virtual channels, wherein, for example, one virtual channel is used to transmit the framebuffer pixel information, another virtual channel is used to send user input event information, and so on.

Once the virtual desktop client 224 receives the clipboard data 214 from the virtual desktop agent 208, it deserializes the data and sets the clipboard delay rendering option on the clipboard 228 of the operating system 222 of the client computing device 220. Clipboard delay rendering is a feature provided by most operating systems generally for the purpose of allowing an application that wishes to place data into the clipboard to delay rendering that data in a specific format until that data is requested from the clipboard. For example, in the Microsoft Windows operating system, the application may specify NULL for the hData parameter of the SetClipboardData function in order to invoke the clipboard delayed rendering option. In the illustrated embodiment, setting the clipboard delay rendering option allows the virtual desktop client 224 to delay having to populate the data 230 into the clipboard 228 and initiate the audit message until a paste operation is received on the clipboard 228. Frequently, this is useful because it may be desirable to only audit those clipboard operations which are actually redirected, e.g. those operations which actually transfer data outside of the virtual desktop. If audit messages were to be generated each time a copy operation was detected, the audit logs would also include "noise" information about clipboard operations which were never actually pasted and those which were only pasted inside of the virtual desktop, etc.

Continuing with the illustration, at some later point in time, a paste operation is detected from an application 226 executing locally on the OS 222 of the client computing device 220. For example, the user may select an object or data inside of a window corresponding to application 226 (different from the window corresponding to the virtual desktop interface provided by the virtual desktop client 224) and click the control-V key or right click and select the "Paste" option from the dropdown menu. The result of this paste operation is that the application 226 sends a request to the virtual desktop client 224 to render the data to the clipboard 228. In one embodiment, this request may be sent by the application 226 accessing the application programming interfaces (APIs) of the OS 222 because at that point in time the virtual desktop client 224 is still the owner of the clipboard 228. For example, in the Windows OS, a WM_RENDERFORMAT message is received when the clipboard data in the clipboard has not been rendered by the clipboard owner. In response to this request, the virtual desktop client 224 populates the data received from the virtual desktop agent into the clipboard 228 (e.g. it renders the data in a particular format). In addition, the virtual desktop client 224 checks whether clipboard auditing was enabled and if it is, the virtual desktop client 224 triggers an audit message to record the log entry describing the clipboard operation that was redirected. In the illustrated embodiment, the audit message is sent from the virtual desktop client 224 to the virtual desktop agent 208, which in turn sends the audit message to an event logger 232 that records the log entry into an event log or a database. However, in alternative embodiments, the virtual desktop client 224 may itself record the log entry, or directly send the audit message to the event logger 232. In any case, the audit message is triggered whenever a paste operation is received from any application executing on the client computing device 220 that requests clipboard data redirected from the virtual desktop agent 208 on the host server 200. In various embodiments, the event logger 232 may be executing on a separate server located in the same data center as the host server 200 or another location and the event logger 232 is configured to record the log entries to an event log in a central location, where information about all of the clipboard operations can be aggregated. Alternatively, the event logger may be a process executing on the host server 200 and locally record the log entries as well.

In various embodiments, each recorded log entry contains detailed information describing the redirected clipboard operation. For example, the log entry may contain the user identifier (ID) of the user that performed the clipboard operation, the total amount of data that was copied and pasted, the type/format of the clipboard data (e.g. whether the data was text, image, etc.), the IP address of the client computing device 220, an identifier of which application the data was copied from, which application the data was pasted to, and the like. The recorded log entries can subsequently be analyzed using any number of log analysis tools in order to gain a detailed understanding about the various clipboard operations that were invoked by virtual desktop users. Among other features, the log analysis software can enable administrators to view the clipboard transactions in a dashboard, perform search queries and reports and correlate the clipboard operations with other events in the system. One example of such log analysis software is VMware's vRealize Log Insight, however many other examples of such tools are commercially available. In some embodiments, alerts can be configured to be triggered for certain types of clipboard events, such as when particularly sensitive corporate data leaves the virtual desktop via a redirected clipboard operation.

In some embodiments, the clipboard redirection may be blocked depending on whether clipboard auditing is supported and/or configured on the virtual desktop. As previously mentioned, during the initial negotiation of the virtual desktop session, the virtual desktop agent 208 and the virtual desktop client 224 exchange information and parameters that will be used during the session. One of the parameters that is negotiated is whether the virtual desktop client 224 and the virtual desktop agent 208 support auditing clipboard operations. Based on this information, the clipboard redirection can be blocked in either or both directions (desktop-to-client or client-to-desktop). For example, the virtual desktop agent 208 may determine that the virtual desktop client 224 is an older version that does not support auditing clipboard operations and therefore would not be capable of issuing audit messages. In such a case, the virtual desktop agent 208 may block clipboard redirection that would otherwise be transmitted to the client. This feature may also be configurable by the administrator. That is, for example, the administrator can specify whether to allow clipboard redirection in situations where the virtual desktop client does not support auditing the clipboard operations.

In some embodiments, the blocking of clipboard redirection may also be performed when a security alert is issued due to auditing the clipboard operations. For example, a security tool may monitor the audit logs and determine that an abnormal amount of data has been transferred outside of the virtual desktop by redirecting clipboard operations. In response to this determination, the security software may issue an alert and/or temporarily disable clipboard redirection for the particular user that has performed the abnormal data transfer. In these embodiments, the clipboard redirection may be blocked for that user.

In some embodiments, the auditing message may depend on whether the clipboard operation originates with applications that physically reside in the same server farm or same data center. A server farm is a group of servers that are located in the same location or same cluster and provide hosting services for applications. For example, an organization may deploy the applications available to its users in a server farm. In some cases, the individual applications may be remoted, similar to the way a full virtual desktop is remoted to a user's client device. In such situations, it may make sense not to audit clipboard operations that are performed between applications located in the same server farm because presumably in those situations, the clipboard data did not leave that server farm. For example, in a situation where the user performs a copy operation in the window of remoted application A and then performs the paste operation in the window of remoted application B which physically resides in the same server farm or data center as application B, the audit message is not triggered, and no log entry is recorded. This can also be made configurable by the administrator based on the needs of the organization. In such embodiments, the clipboard data sequence number which is accessible via the operating system APIs may be used to identify the clipboard operations originating in applications located in the same server farm because these applications are managed by the same remote process, such as the application remoting process. If an application residing in the same server farm requests the data from the clipboard, the clipboard data sequence number matches and the audit operation need not be invoked.

Figure 3:
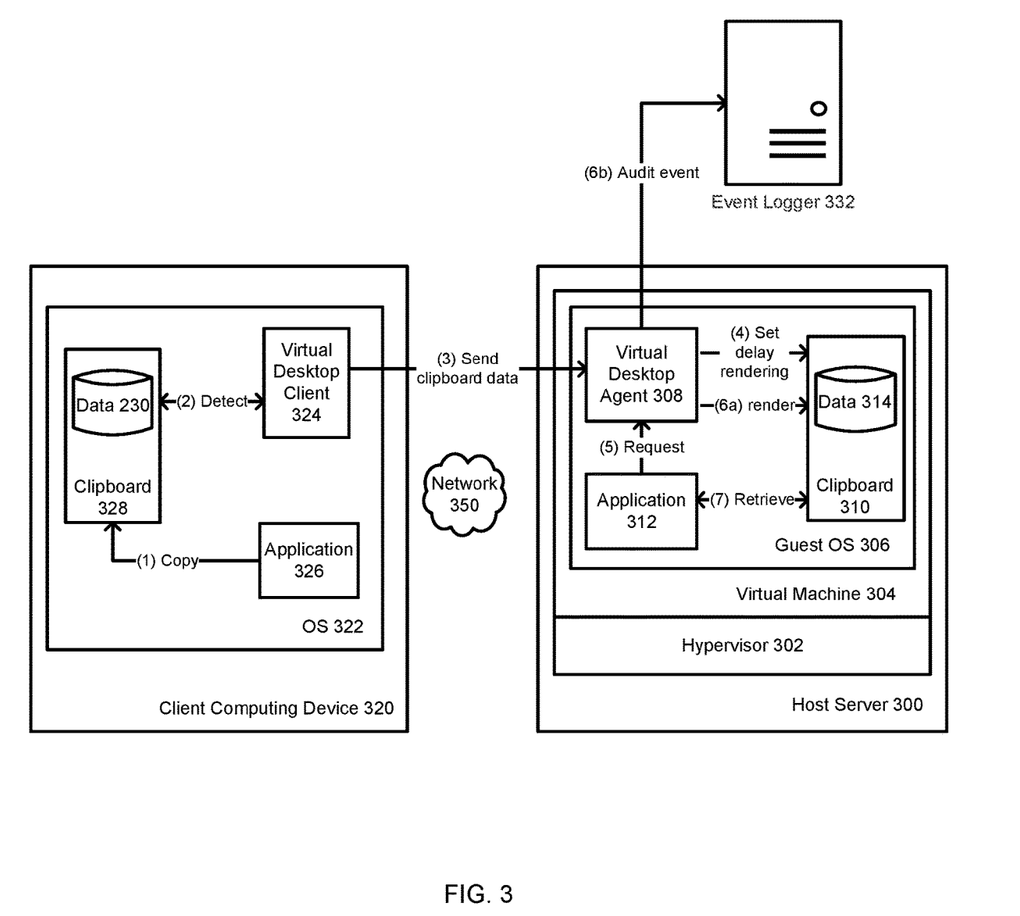
FIG. 3 is an illustration of auditing client-to-desktop redirected clipboard operations, in accordance with various embodiments.

FIG. 3 is an illustration of auditing client-to-desktop redirected clipboard operations, in accordance with various embodiments. Similar to the architecture illustrated in FIG. 2, the virtual desktop of FIG. 3 is also provided using a guest operating system (OS) 306 running on a virtual machine 304 hosted on a host server 300 using a hypervisor 302. The virtual desktop session is also established between the virtual desktop agent 308 and the virtual desktop client 324 operating on the client computing device 320. In the illustration of FIG. 3 however, the clipboard redirection is initiated when an application 326 operating on the client computing device 320 issues a clipboard operation that causes data 230 to be placed in the clipboard of the local operating system 322 of the client computing device 320. For example, the redirection may be initiated when the user selects an item or data inside of the window corresponding to the application 326 and clicks control-C or control-X (or otherwise invokes a cut/copy operation). Notably, because the input was provided outside of the virtual desktop window, the actual mouse/keyboard input event is not transmitted to the virtual desktop as part of the normal desktop remoting protocol. Since the desktop remoting protocol only sends input events detected on items within the virtual desktop window, the input entered inside the window of the locally running application 326 on the client computing device 320 does not cause similar input to be invoked on the guest OS 306 of the virtual desktop, which is contrast to what was illustrated in FIG. 2. However, in some cases, the user may still wish to paste the selected item or data inside the window of the virtual desktop and therefore it is desirable to synchronize the clipboard 328 of the client device 320 with the clipboard of the host server 300 so that the clipboard data is available inside the virtual desktop.

In order to do this, when the virtual desktop client 324 detects that the data 230 has been copied to the clipboard 328, the virtual desktop client 324 sends the clipboard data to the virtual desktop 308 over the network 350. In one embodiment, the clipboard data is transmitted over a separate virtual channel of the desktop remoting protocol, established between the virtual desktop client 324 and the virtual desktop agent 308 for the purpose of synchronizing clipboard information. The virtual desktop agent 308 then unserializes the data and sets the clipboard delay rendering option on the clipboard 310 of the guest OS 306 of the host server 300 to delay rendering the clipboard data until that data is requested in the virtual desktop.

Subsequently, when a user issues a paste operation inside the virtual desktop, e.g. inside of the window of application 312, the virtual desktop agent 308 populates (renders) the data 314 into the clipboard 310 of the guest OS 306 and sends an audit message to an event logger 332. In one embodiment, the virtual desktop agent 308 may first check the GPO to determine whether auditing clipboard redirections from client-to-desktop was enabled and only issue the audit event to the event logger 332 if the GPO specifies that it was. The application 312 is then able to retrieve the clipboard data from clipboard 310 which was redirected from the client computing device 320. The event logger 332 may then record a log entry describing the redirected clipboard operation into an event log or database, as previously described.

Figure 4:
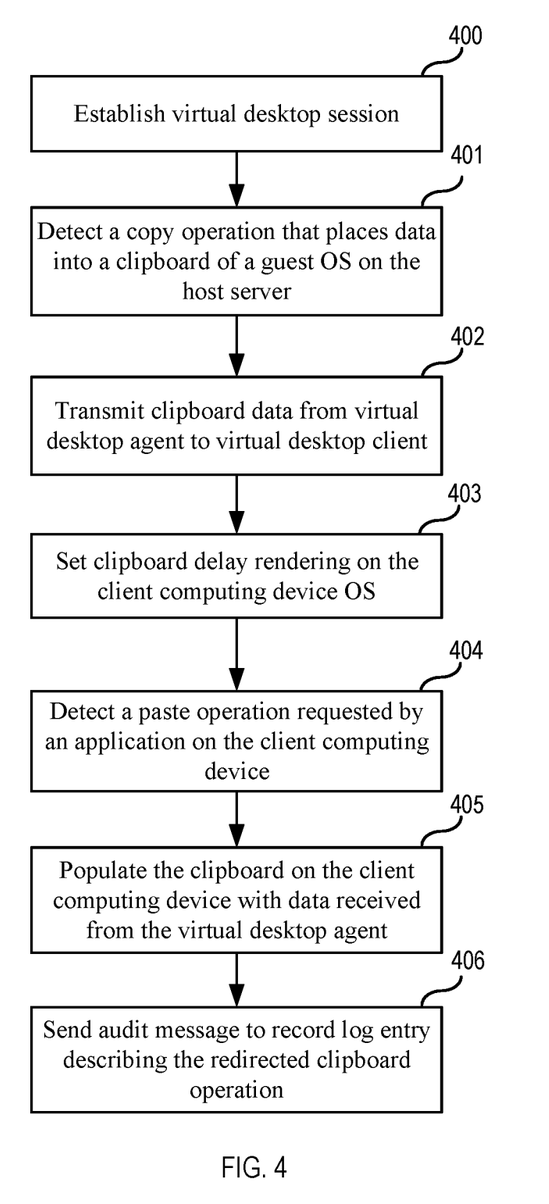
FIG. 4 illustrates a process for auditing clipboard operations redirected from the virtual desktop to the client, in accordance with various embodiments.

FIG. 4 illustrates a process for auditing clipboard operations redirected from the virtual desktop to the client, in accordance with various embodiments. As shown in operation 400, a virtual desktop session is established between the virtual desktop client and a virtual desktop agent. In operation 401, the virtual desktop agent detects a clipboard operation that places data into the clipboard of the guest OS on the host server hosting the virtual desktop. In operation 402, the virtual desktop agent sends the clipboard data over a virtual channel of a desktop remoting protocol to the virtual desktop client. In operation 403, the virtual desktop client receives the data and sets the clipboard delay rendering option on the operating system of the client computing device. In operation 404, a paste operation is detected, requested by an application executing locally on the client computing device. In response to the paste operation, the virtual desktop client populates the clipboard of the local OS on the client device with the clipboard data received from the virtual desktop agent (operation 405). In addition, the virtual desktop client sends an audit message to record a log entry describing the redirected clipboard operation, as shown in operation 406.

Figure 5:
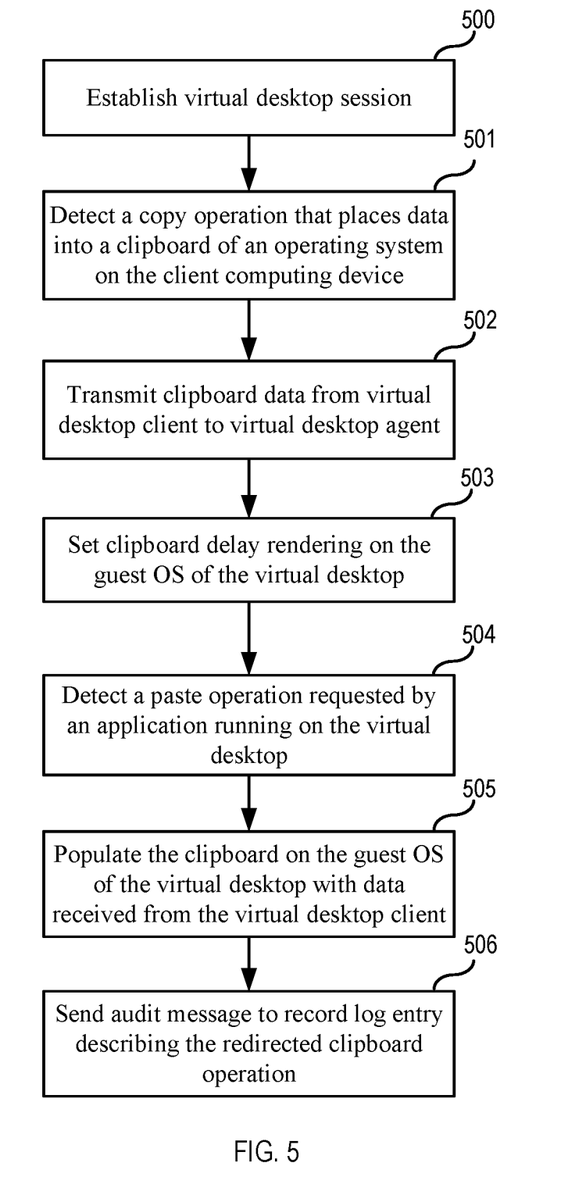
FIG. 5 illustrates a process for auditing clipboard operations redirected from the client to the virtual desktop, in accordance with various embodiments.

FIG. 5 illustrates a process for auditing clipboard operations redirected from the client to the virtual desktop, in accordance with various embodiments. As shown in operation 500, a virtual desktop session is established between the virtual desktop client and a virtual desktop agent. In operation 501, a copy operation is detected that places data into a clipboard of the operating system on the client computing device. In response to detecting the clipboard operation, the virtual desktop client sends the clipboard data to the virtual desktop agent over a virtual channel of the desktop remoting protocol (operation 502). When the virtual desktop agent receives the data, it sets the clipboard delay rendering on the guest OS of the virtual desktop, as shown in operation 503. Subsequently, a paste operation is detected on the virtual desktop, which is requested from an application running on the virtual desktop (operation 504). In response to detecting the paste operation, the virtual desktop agent populates the clipboard on the guest OS of the virtual desktop with the clipboard data received from the virtual desktop client (operation 505). In addition, the virtual desktop agent sends an audit message to record a log entry describing the redirected clipboard operation, as shown in operation 506.

Figure 6:
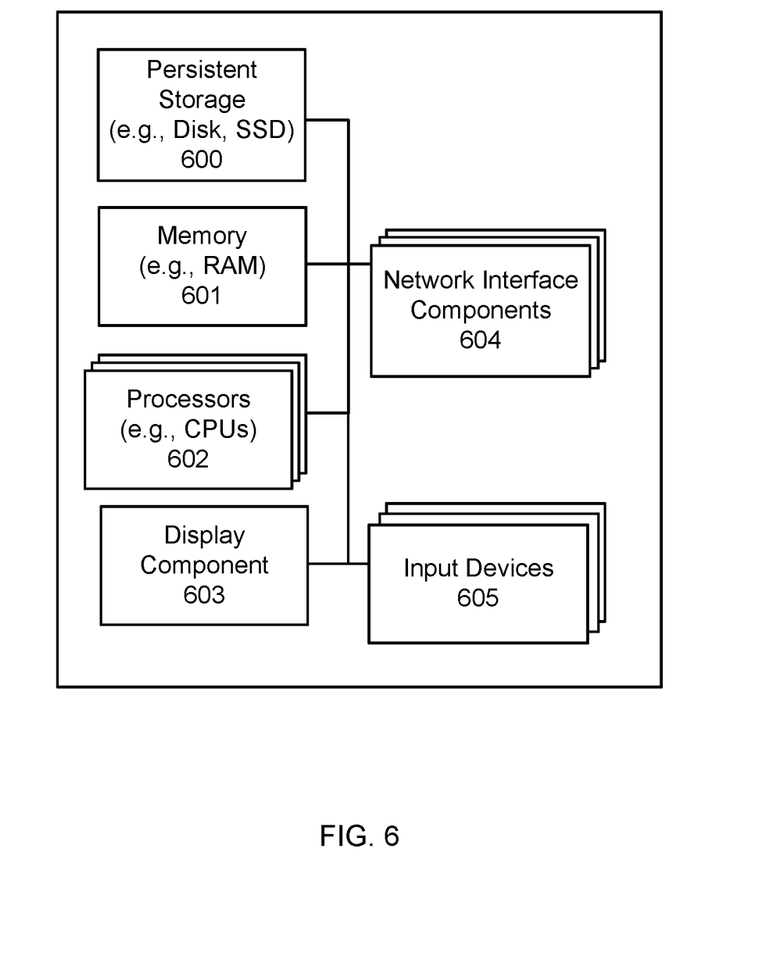
FIG. 6 illustrates an example of some general components of a computing device, in accordance with various embodiments.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random-access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi, Bluetooth, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for auditing clipboard operations in a virtual desktop environment, the method comprising:
    establishing, over a network connection, a virtual desktop session between a virtual desktop client operating on a client computing device and a virtual desktop agent operating on a host server;
    detecting, by the virtual desktop agent, a cut/copy operation that places data into a clipboard of a guest operating system (OS) on the host server;
    in response to detecting the cut/copy operation, transmitting the data placed into the clipboard of the guest OS from the virtual desktop agent to the virtual desktop client over the network connection;
    receiving the data by the virtual desktop client, wherein the virtual desktop client sets a clipboard delay rendering option on the clipboard of an operating system of the client computing device in response to receiving the data from the virtual desktop agent;
    detecting, by the virtual desktop client, a paste operation that requests the data from a clipboard in an operating system on the client computing device; and
    in response to detecting the paste operation, populating the data received from the virtual desktop agent into the clipboard of the operating system of the client computing device by the virtual desktop client and recording a log entry describing the copy and paste operation into an event log, wherein the clipboard delay rendering option delays recording the log entry and populating the data received from the virtual desktop agent into the clipboard of the operating system on the client computing device until the paste operation is detected, wherein the log entry is recorded only if the paste operation is detected on the client device that transfers the data outside of the virtual desktop session, and wherein the log entry is not recorded if the data is pasted inside the virtual desktop session.

2. The method of claim 1, further comprising:
    detecting, by the virtual desktop client, a second cut/copy operation that places data into the clipboard of the operating system of the client computing device;
    in response to detecting the second cut/copy operation, transmitting the data placed into the clipboard of the operating system of the client computing device from the virtual desktop client to the virtual desktop agent over the network connection;
    detecting, by the virtual desktop agent, a second paste operation that requests data from the clipboard of the guest OS on the host server; and
    in response to detecting the second paste operation, populating the data received from the virtual desktop client into the clipboard of the guest OS on the host server by the virtual desktop agent and recording a second log entry into the event log, the second log entry describing the second copy and paste operation.

3. The method of claim 2, wherein the virtual desktop agent uses clipboard delay rendering in order to delay populating the data received from the virtual desktop client into the clipboard of the guest OS on the host server until the second paste operation is received.

4. The method of claim 1, wherein transmitting the data placed into the clipboard of the guest OS from the virtual desktop agent to the virtual desktop client over the network connection further comprises:
    determining whether the virtual desktop client supports auditing clipboard operations prior to transmitting the data to the virtual desktop client; and
    if the virtual desktop client does not support auditing clipboard operations, blocking the transmission of the data to the virtual desktop client, otherwise if the virtual desktop client supports auditing clipboard operations, transmitting the data to the virtual desktop client.

5. The method of claim 1, wherein recording a log entry describing the copy and paste operation into an event log further comprises:
    determining whether the cut/copy operation and the paste operation originate from applications hosted in the same server farm; and
    recording the log entry in the event log only if the cut/copy operation and the paste operation do not originate from applications hosted in the same server farm.

6. The method of claim 1, wherein the log entry indicates:
an amount of the data received from the virtual desktop agent and populated into the clipboard of the operating system of the client computing device;
a format of the data;
user identifier (ID) and/or domain of a user that initiated the copy and paste operation;
internet protocol (IP) address of the client computing device; and
a process identifier (ID) of an application that requested the paste operation from the operating system on the client computing device.

7. A computing device, comprising:
at least one processor; and
memory including instructions that, when executed by the at least one processor, cause the computing device to perform the steps of:
establishing, over a network connection, a virtual desktop session between a virtual desktop client operating on a client computing device and a virtual desktop agent operating on a host server;
detecting, by the virtual desktop agent, a cut/copy operation that places data into a clipboard of a guest operating system (OS) on the host server;
in response to detecting the cut/copy operation, transmitting the data placed into the clipboard of the guest OS from the virtual desktop agent to the virtual desktop client over the network connection;
receiving the data by the virtual desktop client, wherein the virtual desktop client sets a clipboard delay rendering option on the clipboard of an operating system of the client computing device in response to receiving the data from the virtual desktop agent;
detecting, by the virtual desktop client, a paste operation that requests the data from a clipboard in an operating system on the client computing device; and
in response to detecting the paste operation, populating the data received from the virtual desktop agent into the clipboard of the operating system of the client computing device by the virtual desktop client and recording a log entry describing the copy and paste operation into an event log, wherein the clipboard delay rendering option delays recording the log entry and populating the data received from the virtual desktop agent into the clipboard of the operating system on the client computing device until the paste operation is detected wherein the log entry is recorded only if the paste operation is detected on the client device that transfers the data outside of the virtual desktop session, and wherein the log entry is not recorded if the data is pasted inside the virtual desktop session.

8. The computing device of claim 7, wherein the memory further comprises instructions that, when executed by the at least one processor, cause the computing device to perform the steps of:
detecting, by the virtual desktop client, a second cut/copy operation that places data into the clipboard of the operating system of the client computing device;
in response to detecting the second cut/copy operation, transmitting the data placed into the clipboard of the operating system of the client computing device from the virtual desktop client to the virtual desktop agent over the network connection;
detecting, by the virtual desktop agent, a second paste operation that requests data from the clipboard of the guest OS on the host server; and
in response to detecting the second paste operation, populating the data received from the virtual desktop client into the clipboard of the guest OS on the host server by the virtual desktop agent and recording a second log entry into the event log, the second log entry describing the second copy and paste operation.

9. The computing device of claim 8, wherein the virtual desktop agent uses clipboard delay rendering in order to delay populating the data received from the virtual desktop client into the clipboard of the guest OS on the host server until the second paste operation is received.

10. The computing device of claim 7, wherein transmitting the data placed into the clipboard of the guest OS from the virtual desktop agent to the virtual desktop client over the network connection further comprises:
determining whether the virtual desktop client supports auditing clipboard operations prior to transmitting the data to the virtual desktop client; and
if the virtual desktop client does not support auditing clipboard operations, blocking the transmission of the data to the virtual desktop client, otherwise if the virtual desktop client supports auditing clipboard operations, transmitting the data to the virtual desktop client.

11. The computing device of claim 7, wherein recording a log entry describing the copy and paste operation into an event log further comprises:
determining whether the cut/copy operation and the paste operation originate from applications hosted in the same server farm; and
recording the log entry in the event log only if the cut/copy operation and the paste operation do not originate from applications hosted in the same server farm.

12. The computing device of claim 7, wherein the log entry indicates:
an amount of the data received from the virtual desktop agent and populated into the clipboard of the operating system of the client computing device;
a format of the data;
user identifier (ID) and/or domain of a user that initiated the copy and paste operation;
internet protocol (IP) address of the client computing device; and
a process identifier (ID) of an application that requested the paste operation from the operating system on the client computing device.

13. A non-transitory computer readable storage medium comprising one or more sequences of instructions, the instructions when executed by one or more processors causing the one or more processors to execute the operations of:
establishing, over a network connection, a virtual desktop session between a virtual desktop client operating on a client computing device and a virtual desktop agent operating on a host server;
detecting, by the virtual desktop agent, a cut/copy operation that places data into a clipboard of a guest operating system (OS) on the host server;
in response to detecting the cut/copy operation, transmitting the data placed into the clipboard of the guest OS from the virtual desktop agent to the virtual desktop client over the network connection;
receiving the data by the virtual desktop client, wherein the virtual desktop client sets a clipboard delay rendering option on the clipboard of an operating system of the client computing device in response to receiving the data from the virtual desktop agent;

detecting, by the virtual desktop client, a paste operation that requests the data from a clipboard in an operating system on the client computing device; and in response to detecting the paste operation, populating the data received from the virtual desktop agent into the clipboard of the operating system of the client computing device by the virtual desktop client and recording a log entry describing the copy and paste operation into an event log, wherein the clipboard delay rendering option delays recording the log entry and populating the data received from the virtual desktop agent into the clipboard of the operating system on the client computing device until the paste operation is detected, wherein the log entry is recorded only if the paste operation is detected on the client device that transfers the data outside of the virtual desktop session, and wherein the log entry is not recorded if the data is pasted inside the virtual desktop session.

14. The non-transitory computer readable storage medium of claim 13, further comprising instructions which when executed by one or more processors causing the one or more processors to execute the operations of:

detecting, by the virtual desktop client, a second cut/copy operation that places data into the clipboard of the operating system of the client computing device;

in response to detecting the second cut/copy operation, transmitting the data placed into the clipboard of the operating system of the client computing device from the virtual desktop client to the virtual desktop agent over the network connection;

detecting, by the virtual desktop agent, a second paste operation that requests data from the clipboard of the guest OS on the host server; and in response to detecting the second paste operation, populating the data received from the virtual desktop client into the clipboard of the guest OS on the host server by the virtual desktop agent and recording a second log entry into the event log, the second log entry describing the second copy and paste operation.

15. The non-transitory computer readable storage medium of claim 14, wherein the virtual desktop agent uses clipboard delay rendering in order to delay populating the data received from the virtual desktop client into the clipboard of the guest OS on the host server until the second paste operation is received.

16. The non-transitory computer readable storage medium of claim 13, wherein transmitting the data placed into the clipboard of the guest OS from the virtual desktop agent to the virtual desktop client over the network connection further comprises:

determining whether the virtual desktop client supports auditing clipboard operations prior to transmitting the data to the virtual desktop client; and if the virtual desktop client does not support auditing clipboard operations, blocking the transmission of the data to the virtual desktop client, otherwise if the virtual desktop client supports auditing clipboard operations, transmitting the data to the virtual desktop client.

17. The non-transitory computer readable storage medium of claim 13, wherein recording a log entry describing the copy and paste operation into an event log further comprises:

determining whether the cut/copy operation and the paste operation originate from applications hosted in the same server farm; and recording the log entry in the event log only if the cut/copy operation and the paste operation do not originate from applications hosted in the same server farm.

* * * * *